(12) United States Patent
Adoc, Jr. et al.

(10) Patent No.: US 9,411,872 B1
(45) Date of Patent: *Aug. 9, 2016

(54) MANAGEMENT OF APPLICATION STATE DATA

(71) Applicant: Amazon Technologies, Inc., Seattle, WA (US)

(72) Inventors: Mario Vargas Adoc, Jr., San Francisco, CA (US); Richard David Krog, Seattle, WA (US); Christopher Lawrence Lavin, Seattle, WA (US); Jeremy Stephen Hynoski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,396

(22) Filed: Jan. 19, 2016

Related U.S. Application Data

(63) Continuation of application No. 13/921,503, filed on Jun. 19, 2013, now Pat. No. 9,244,993.

(51) Int. Cl.
G06F 17/30 (2006.01)
H04L 29/08 (2006.01)

(52) U.S. Cl.
CPC ...... *G06F 17/30581* (2013.01); *H04L 67/1095* (2013.01); *H04L 67/2842* (2013.01)

(58) Field of Classification Search
CPC .......... G06F 17/30174; G06F 17/3048; G06F 17/30575; Y10S 707/99941
See application file for complete search history.

(56) References Cited

U.S. PATENT DOCUMENTS

| 8,734,255 | B2 * | 5/2014 | van Os | A63F 13/10 463/42 |
| 9,244,993 | B1 * | 1/2016 | Adoc, Jr. | G06F 17/30575 |
| 2010/0279774 | A1 * | 11/2010 | Braig | A63F 13/12 463/40 |
| 2014/0187315 | A1 * | 7/2014 | Perry | A63F 13/10 463/29 |

OTHER PUBLICATIONS

U.S. Appl. No. 13/921,735, filed Jun. 19, 2013 and entitled "Idempotency of Application State Data".
U.S. Appl. No. 13/850,119, filed Mar. 25, 2013 and entitled "Resovling Conflicts Within Saved State Data".

* cited by examiner

*Primary Examiner* — Cheryl Lewis
(74) *Attorney, Agent, or Firm* — Thomas|Horstemeyer, LLP

(57) ABSTRACT

Disclosed are various embodiments for synchronizing application state information across devices. More specifically, embodiments of the disclosure are related to generating and storing of application state information. Key-value pairs are stored on a client device and synchronized with an application synchronization service.

20 Claims, 5 Drawing Sheets

MANAGEMENT OF APPLICATION STATE DATA

CROSS-REFERENCE TO RELATED APPLICATIONS

This application is a continuation of and claims the benefit of U.S. patent application Ser. No. 13/921,503, entitled "MANAGEMENT OF APPLICATION STATE DATA," and filed Jun. 19, 2013, issued as U.S. Pat. No. 9,244,993, which is hereby incorporated by reference in its entirety.

BACKGROUND

Applications that are distributed via an application marketplace are often installed on multiple devices by a user. A developer of an application may wish to synchronize state information across the multiple installations across various devices of a particular application. The state information is generated by the various instances of the application executing on the client devices that are associated with a particular user.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to synchronizing data associated with the state of an application between multiple devices that may be associated with a user. Applications that are distributed via an application marketplace are often installed on multiple devices associated with a user account. For example, a user may own a tablet device as well as a smartphone and install an application distributed by the application marketplace on both devices. Accordingly, embodiments of the disclosure can facilitate synchronization of data relating to the application across the various devices associated with the user by employing an application synchronization service to which applications report application state information, which can in turn facilitate synchronization of application state information across multiple devices of the user.

When an application is a game application, application state information can comprise, for example, information that is related to game applications, such as scoring data, game progress, game achievements, game timing information, time stamps, and any other information relating to execution of a game. Application state information can also related to media such as books, movies, music, etc., that are rendered or consumed via a media player application. In this scenario, the application state information can relate to a page number and/or time code within media that a user last viewed and/or consumed. Application state information can also include information related to an accumulated value, such as a report indicating the user's accumulation and/or usage or spending of coins or points during a gameplay session. Therefore, embodiments of the present disclosure provide mechanisms for caching and storage of application state information on a client device executing the application.

Figure 1A:
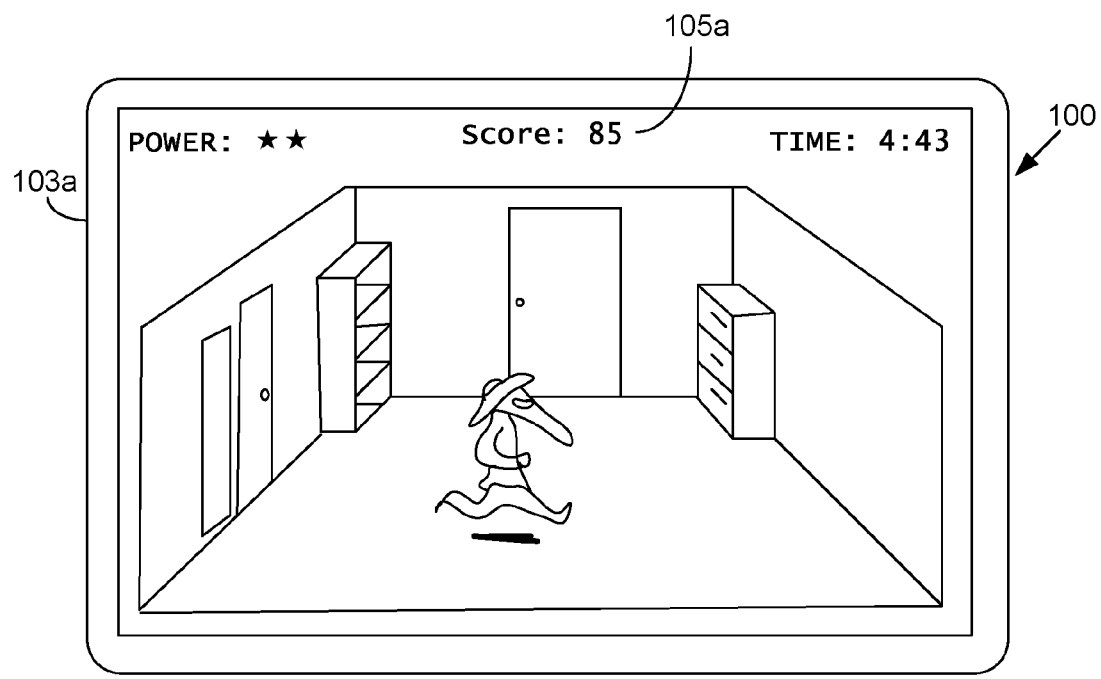
FIGS. 1A-1B are drawings of example applications executed by client devices according to various embodiments of the present disclosure.
Figure 1B:
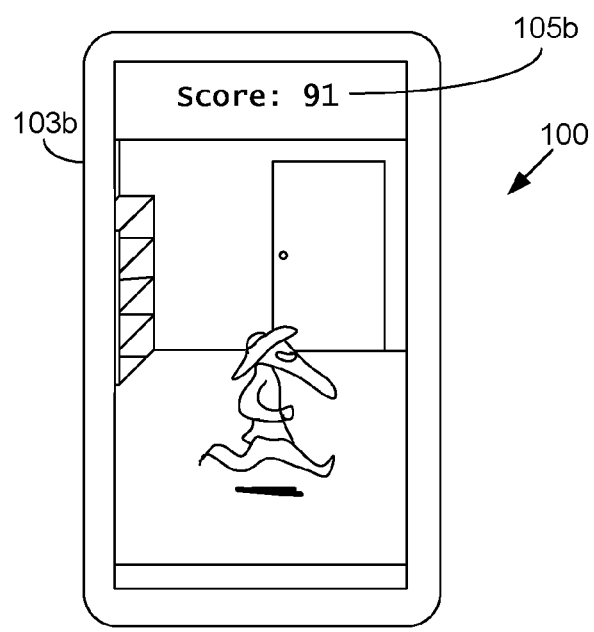

With reference to FIGS. 1A-1B, shown is an example scenario in which an application executed by client devices 103a and 103b. In the scenario 100 shown in FIGS. 1A-1B, the application can be distributed by an application marketplace. In the example of FIGS. 1A-1B, the client devices 103a and 103b are associated with a particular user account. In other words, the user or other entity has installed the same application on multiple devices. An application synchronization service can be associated with the application marketplace and/or independent from an application marketplace and facilitates synchronization of game state data.

As shown in the example of FIG. 1A, an application instance is executed by the client device 103a can incorporate functionality in which a user may utilize an account held with a third party service for the purpose of tracking accumulation of coins or points, tracking achievements, game progress, game scores, or any other data related to the state of an application that can be saved. Accordingly, an application can be bundled with a software library and/or code fragments related to an application marketplace and/or application synchronization service that facilitate the creation of application state information in a data structure that can be transmitted to a synchronization service. As shown in the client device 103b that is also associated with the user, another application instance corresponding to the same application may be executed by another device associated with the user.

Accordingly, each application instance may report, for example, scoring information 105a, 105b that is synchronized across all instances of execution of the application that are associated with a particular user account. Accordingly, as shown in the scenario of FIGS. 1A and 1B, the user may earn points in a gameplay session on a first device as well as on a second device, with the scoring information being synchronized across the devices of the user that is facilitated by embodiments of the disclosure.

Accordingly, to facilitate such synchronization, applications may be instrumented to store information pertaining to events that occur during execution of the application, such as the accumulation of points, high scores, and other state information as can be appreciated. Information about events can be stored in the form of key-value pairs that are generated by the application, stored locally within the client device 103, and synchronized via an application synchronization service, as will be described in further detail herein. In the following discussion, a general description of the system and its components is provided, followed by a discussion of the operation of the same.

Figure 2:
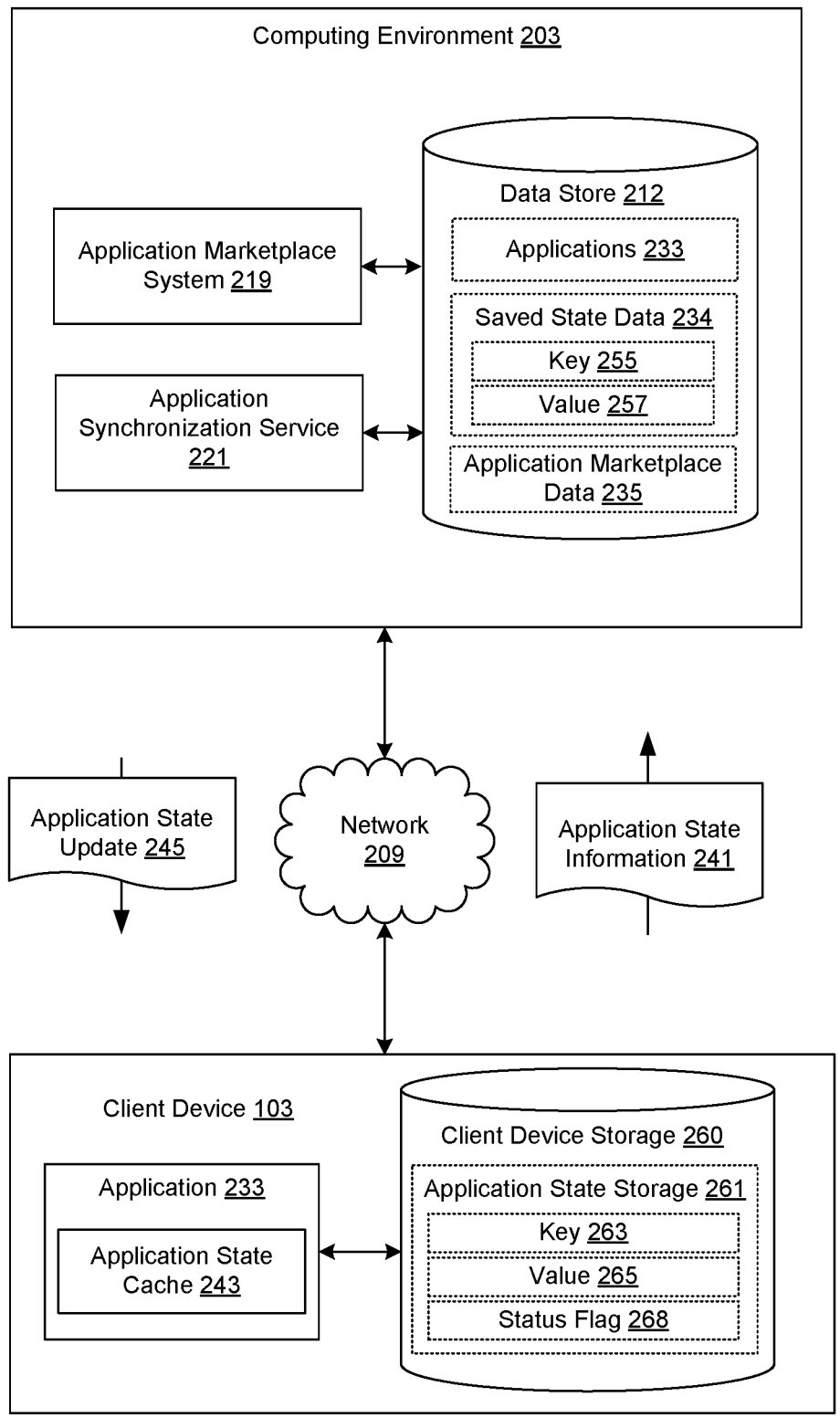
FIG. 2 is a drawing of a networked environment according to various embodiments of the present disclosure.

Turning now to FIG. 2, shown is a networked environment 200 according to various embodiments. The networked environment 200 includes a computing environment 203 and one or more clients 103 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an application marketplace system 219, application synchronization service 221 and other applications, services, processes, systems, engines, or functionality not discussed in detail herein. The application marketplace system 219 may communicate with the client device 103 using various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 209.

The application marketplace system 219 is executed to provide functionality relating to an application marketplace in which a multitude of applications 233 may be submitted by developers and made available for purchase and/or download by users. The application marketplace system 219 may include functionality relating to electronic commerce, e.g., shopping cart, ordering, and payment systems. The application marketplace system 219 may support searching and categorization functionality so that users may easily locate applications 233 that are of interest. The application marketplace system 219 may include functionality relating to verification of compatibility of applications 233 with various clients 103.

The application synchronization service 221 is executed to synchronize application state information 241 associated with instances of applications 233 executed by various client devices 103 that are associated with a user account. Application state information 241 can include information relating to application usage that is associated with an application instance executed by a client device 103. For example, application state information 241 can include a score or achievement achieved by a user in an application instance. Application state information 241 can also include saved game data, or a score, level, or other state information from which a user may resume gameplay at a later point in time on the same client device 103 or another client device 103.

The data stored in the data store 212 includes, for example, applications 233, saved state data 234 relating to applications 233 that are executed by client devices 103, application marketplace data 235, and potentially other data. The applications 233 correspond to those applications 233 that have been submitted by developers and/or others, for example, for inclusion in the application marketplace. The application 233 may correspond, for example, to a game or other types of applications. As non-limiting examples, the application 233 may correspond to a first-person shooter game, an action game, an adventure game, a party game, a role-playing game, a simulation game, a strategy game, a vehicle simulation game, and/or other types of games.

The application 233 may be a game originally designed for execution in a general-purpose computing device or in a specialized video game device such as, for example, a video game console, a handheld game device, an arcade game device, etc. The applications 233 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications. Where game applications are mentioned in the following text, it is understood that game applications are merely examples of the many different types of applications 233.

The application 233, when executed by a client device 103, may expect to access one or more resources of the client device on which it is executed. Such resources may correspond to display devices, input devices, or other devices. In some cases, the application 233 may request exclusive access to one or more of the resources, whereby no other applications may have access to the particular resources. Each application 233 may include, for example, object code, binary code, source code, metadata and/or other data. The object code corresponds to code that is executable by clients 103, either natively by a processor or by way of a virtual machine executed by the processor.

The saved state data 234 that is maintained by the application marketplace system 219 includes various data relating to execution of applications 233 by client devices 103 that are associated with a particular user account. For example, the saved state data 234 may include one or more accumulated totals, such as a coin balance or point balance, information about progress of a user within execution of an application by users, such as a level at which a user has progressed within a game, scoring information, achievement information relating to a game, etc. Saved state data 234 can be organized into various keys 255 and corresponding values 257. Accordingly, a key 255 can represent an event name of an event occurring in an application 233 executed by a client device 103 that an application developer may wish to synchronize across the various devices of a user. The key 255 can also take the form of an event name or event identifier that is combined with a synchronization rule. The value 257 can represent the value associated with the event, such as a coin balance, point balance, score, lap time, level, page number, or any other data about application state that a developer wishes to synchronize across the various devices of a user.

The data associated with the application marketplace data 235 includes, for example, download information, categories, application usage data and/or other data. The download information indicates the popularity, either in terms of absolute number of downloads or in terms of relative popularity, of the applications 233 offered by the application marketplace data 235. The download information can also identify users, either individually by a user account and/or on an aggregate basis according to demographic category, who have downloaded a particular application 233. The categories correspond to groupings of applications 233 that may indicate similar applications 233 and may be employed by users to more easily navigate the offerings of the application marketplace data 235. Non-limiting examples of categories may include social networking applications 233, mapping applications 233, movie information applications 233, shopping applications 233, music recognition applications 233, and so on. The application marketplace data 235 can also include information about users, such as user profile data, user authentication information, usage data of users with regard to application 233 (e.g., game progress, high scores, and achievements).

The application marketplace data 235 can also include information about the various client devices 103 that are registered to user accounts of the application marketplace system 219. Accordingly, the application marketplace data 235 can relate a device identifier with a user account so that the application synchronization service 221 may determine which client device 103 corresponds to a given key 255 and/or value 257 that is stored in the data store 212.

The client device 103 is representative of a plurality of client devices that may be coupled to the network 209. The clients 103 may be geographically diverse. The client device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client device 103 may include a display device. The display may comprise, for example, one or more devices such as cathode ray tubes (CRTs), liquid crystal display (LCD) screens, gas plasma-based flat panel displays, LCD projectors, or other types of display devices, etc. The client device 103 may include one or more input devices. The input devices may comprise, for example, devices such as keyboards, mice, joysticks, accelerometers, light guns, game controllers, touch pads, touch sticks, push buttons, optical sensors, microphones, webcams, and/or any other devices that can provide user input. Additionally, various input devices may incorporate haptic technologies in order to provide feedback to the user.

The client device 103 may be configured to execute various applications 233 that are distributed via the application marketplace system 219. An application 233 executed by a client device 103, as is noted above, can be instrumented to generate data related to the occurrence of events during execution of the application 233. The data generated by the application 233 can be synchronized by the application synchronization service 221 across the various client devices 103 that are registered to a particular user account. To this end, the application 233 or a software library or other code fragment that is invoked by the application 233 can generate a key and a value that are associated with a particular event occurring within an application 233.

The client device 103 is configured with an application state cache 243 that can cache key-value pairs associated with an event occurring within an application 233. The application state cache 243 can be maintained and/or stored in memory. The client device 103 is also configured with client device storage 260, which can comprise a mass storage device such as disk storage, flash memory storage, non-volatile memory, or any other type of mass storage device. The client device storage 260 includes application state storage 261, which can store information pertaining to events occurring during execution of an application 233. For example, the application state storage 261 can store a key 263 that corresponds to a particular event occurring within an application 233. Each key 263 can also have a corresponding value 265 that represents a particular value associated with the event. Additionally, the application can also be configured to generate a timestamp that corresponds to an event occurring during execution of the application 233. In some embodiments, the application 233 can generate and/or set a status flag 268 that corresponds to the event. The status flag 268 can indicate whether a value 265 corresponding to a particular key 263 has changed since a most recent synchronization event.

The application state storage 261 can take the form of various data structures, such as a map, hash table, tree, or any other data structure in which key-value pairs or other data can be stored. Accordingly, a key 263 and value 265 that are generated and/or updated by the application 233 in response to the occurrence of an event during execution of the application 233 are first cached within the application state cache 243. Then, key-value pairs that are generated by the application 233 and cached in memory within the application state cache 243 are stored by the application 233 within the application state storage 261 of the client device 103. The key 263 and value 265 can be stored in association with a timestamp as well as potentially a status flag 268 that indicates whether the key 263 and/or value 265 has been transmitted to the application synchronization service 221 for storage in the data store 212.

To transmit state information corresponding to an application 233 to the application synchronization service 221, the application 233 can generate application state information 241 that includes data related to one or more events occurring within one or more applications 233 executed by the client device 103 for transmission to the application synchronization service 221. The application state information 241 can comprise a data structure that includes data associated with an event occurring during execution of an instance of one or more applications 233. For example, application state information 241 can include data related to an accumulated value, such as a coin balance of a user, associated with execution of the application 233 by a client device 103, a high score of a user within a game application, game progress status of a user related to a game application and any other events that might be generated within the application 233 and which the application 233 is instrumented to synchronize data with the application synchronization service 221.

Various techniques relating to synchronization of application state information are described in U.S. patent application Ser. No. 13/850,119 entitled "RESOLVING CONFLICTS WITHIN SAVED STATE DATA," filed Mar. 25, 2013; and U.S. Patent Application entitled "IDEMPOTENCY OF APPLICATION STATE DATA," filed Jun. 19, 2013; both of which are incorporated herein by reference in their entirety.

Next, a general description of the operation of the various components of the networked environment 200 is provided. As noted above, an application 233 executing by a client device 103 can be instrumented upon the occurrence of an event during execution of an application instance to generate application state information 241 containing information about the event. For example, when a certain level and/or achievement within a game application are reached, the application 233 can generate information about the event, which can be cached within the application state cache 243. As a user reaches certain milestones or accomplishes tasks within an application 233, the application 233 can be configured to award coins, points, or any other reward balance. Additionally, the user may spend these rewards to unlock portions of an application 233 and/or obtain other rewards or items, which cause a decrease in the accumulated total associated with the user. As yet another example, the user's progress within a game application can also be tracked and application state information 241 identifying scores, times (e.g., lap times, time to complete levels, time to reach milestones, etc.) or other state information associated with the application 233 can be generated.

The application 233 can generate application state information 241 by utilizing a software library having an application programming interface (API) provided by and/or associated with the application synchronization service 221 so that the application state information 241 can be created in a standardized data format. In other embodiments, the application 233 can be instrumented to generate application state information 241 in a standardized data format.

The data format corresponding to application state information 241 can be implemented as a text-based data interchange format, such as JavaScript Object Notation (JSON), or any other standardized or proprietary data interchange format that can allow for the exchange of structured data. Accordingly, the application 233 executed by a client device 103 can generate and transmit application state information 241 to the application synchronization service 221, which can extract and store the application state information 241 as saved state data 234.

Application state information 241 may be transmitted by the application 233 to the application synchronization service 221 asynchronously from multiple client devices 103 when a particular client device 103 has the capability to transmit data via the network 209. For example, the application 233 can cache application state information 241 in the application state cache 243 in the client device 103, transmit the application state information 241 upon the occurrence of an event, such as termination of the application, network 209 accessibility, the reaching of a level and/or achievement within an application, a size of the application state cache 243 and/or application state storage 261 reaching a threshold size, after the passage of a threshold amount of time since a most recent generation and transmission of application state information 241 to the application synchronization service, or in response to any other event or threshold. Application state information 241 can also be generated in real time as and when events are generated within an application instance corresponding to the application 233, or upon the occurrence of other events.

Accordingly, because a client device 103 may execute multiple applications 233 that employ the services the application synchronization service 221, a software library invoked by the application 233 may provide any or all of the functionality described herein. Additionally, the application state cache 243 may be generated by such a software library and maintained in memory on the client device 103 for use by various applications 233 executed by the client device 103. Similarly, the application state storage 261 can be generated by such a software library and maintained in the client device storage 260 for use by various applications 233 executed by the client device 103.

Therefore, when an application 233 is executed by the client device 103, an event may occur for which the application 233 is instrumented to generate a corresponding key and value (e.g., event name and event value). The application 233 can also generate a corresponding status flag and/or timestamp. As noted above, the status flag can indicate that the key and value have been updated since a most recent synchronization with the application synchronization service 221, or a "synchronization event." The key, value and timestamp can be initially stored in the application state cache 243 by the application 233. Upon expiration of a predetermined waiting period after storing of the data in the application state cache 243, the application 233 can then store the key 263, value 265 and status flag 268 in the application state storage 261. Some applications 233 may be instrumented to generate multiple events and corresponding key-value pairs within close temporal proximity to one another. For example, upon completion of a level within a game application by a user, the application 233 may be instrumented to generate various events relating to scoring information, progress data, achievement accumulation, and various other events associated with the completion of a level and for which key-value pairs are generated within close temporal proximity.

Therefore, the predetermined waiting period allows multiple possible key-value pairs to be stored into the application state cache 243 and in turn allows these key-value pairs to be batch submitted to storage in the application state storage 261. Batch submission of key-value pairs from the application state cache 243 can reduce resource consumption on the client device 103 by potentially limiting numerous accesses to the mass storage resources of the client device 103. The predetermined waiting period can be, for example, 100 milliseconds, or any other waiting period that provides a sufficient buffer or waiting period for the application 233 to potentially generate additional events and corresponding key-value pairs. Additionally, in some embodiments the application 233 also stores a status flag 268 that provides an indication regarding whether a given key 263 and/or value 265 was created, changed or updated by the application 233 within the application state storage 261 since a most recent synchronization event.

The status flag 268 can have various possible values. For example, the status flag 268 can have a value that corresponds to a "synchronized" state. Such a state corresponds to a condition in which the corresponding key 263 and value 265 do not require synchronization with the application synchronization service 221. The status flag 268 can also have a value that corresponds to a "dirty" state. Such a state corresponds to a condition in which the corresponding key 263 and value 265 have been created and/or modified since a most recent synchronization event. The status flag 268 can also have a value that corresponds to a "synchronizing" state. Such a state corresponds to a condition in which the corresponding key 263 and value 265 are in the process of being transmitted from the client device 103 to the application synchronization service 221. Therefore, when a given key-value pair is created and/or updated, the status flag 268 can also be updated by the application 233 to indicate that the key-value pair is in a "dirty" state.

Should an additional event occur within the application 233 during the above-referenced waiting period and should an additional key-value pair be generated during the predetermined waiting period, the additional key-value pair can also be stored within the application state cache 243. In some embodiments, the predetermined waiting period can be reset, or restarted, by the application 233 when an additional event occurs during the predetermined waiting period for which a key-value pair is stored in the application state cache 243 by the application 233.

The application 233 is also instrumented to periodically report information related to its state (e.g., key-value pairs) in the form of application state information 241. In some embodiments, the application 233 can report information about multiple events that are assembled into a data structure that is presented in a data interchange format, such as JavaScript Object Notation (JSON), and transmitted to the application synchronization service 221 as application state information 241. In some embodiments, the application 233 can periodically generate and transmit application state information 241 to the application synchronization service 221 according to a predefined schedule.

In other embodiments, the application 233 can generate application state information 241 as and when key-value pairs are stored in application state storage 261. In other embodiments, the application 233 can generate application state information 241 and transmit the application state information 241 to the application synchronization service 221 upon expiration of another predetermined waiting period that begins when a given key 263 and value 265 are stored in the application state storage 261. Should an additional key 263 and value 265 be stored within the application state storage 261 during the other predetermined waiting period, the additional key-value pair can also be included in an application state information 241 data structure generated by the application 233. In some embodiments, the predetermined waiting period can be reset, or restarted, by the application 233 when an additional key-value pair is stored in the application state storage 261 during the other waiting period.

The application 233 can also be configured to generate application state information 241 that only includes those items (e.g., key-value pairs) that have changed since a most recent synchronization with the application synchronization service 221. In other words, the application state information 241 can be generated to include the items that have changed since the most recent transmission of application state information 241 to the application synchronization service 221. Accordingly, the application can generate application state information 241 that includes those items having a status flag 268 in a "dirty" state. The application 233 can exclude from the application state information 241 those items having a status flag 268 in a "synchronized" state, as these items do not require synchronization with the application synchronization service 221. Additionally, the application 233 can also modify the status flag 268 of those items included within the application state information 241 to a "synchronizing" state until the application 233 transmits application state information 241 including the items to the application synchronization service 221 and/or receives a response from the application synchronization service 221 indicating successful receipt of the application state information 241, whereupon the application 233 can then modify the status flag 268 of the items corresponding to the application state information 241 to "synchronized." In this way, the application 233 can avoid duplicate transmission of information about items to the application synchronization service 221 during a subsequent synchronization event.

Therefore, the application 233 and/or software library that facilitates synchronization with the application synchronization service 221 can identify those values 265 within the application state storage 261 that have been created, updated and/or changed since a most recent synchronization event and generate application state information 241 that includes those values 265 as well as other information, such as a timestamp, key 263, synchronization rule, and other data. In some embodiments, each time that the application 233 generates and transmits application state information 241 to the application synchronization service 221, the application 233 can store a timestamp corresponding to when the synchronization event occurred. Such a timestamp can be stored within the client device storage 260. Therefore, the application 233 can identify those values 265 that have changed within the application state storage 261 since a most recent synchronization event by identifying values 265 associated with a timestamp that is later than the timestamp associated with the synchronization event. In other embodiments, the application 233 can identify those values 265 that have a status flag 268 that corresponds to a "dirty" state.

Accordingly, the application can identify those items associated with a status flag indicating that the key and/or value has not been synchronized with the application synchronization service 221 and include data relating to the key 263 and value 265 in an application state information 241 that is generated and transmitted to the application synchronization service 221. When the application 233 obtains a response from the application synchronization service 221 indicating that information about a particular key 263 and/or value 265 corresponding to a "dirty" status flag 268 has been successfully received by the application synchronization service 221, the application 233 can then modify the status flag 268 to "synchronized."

Figure 3:
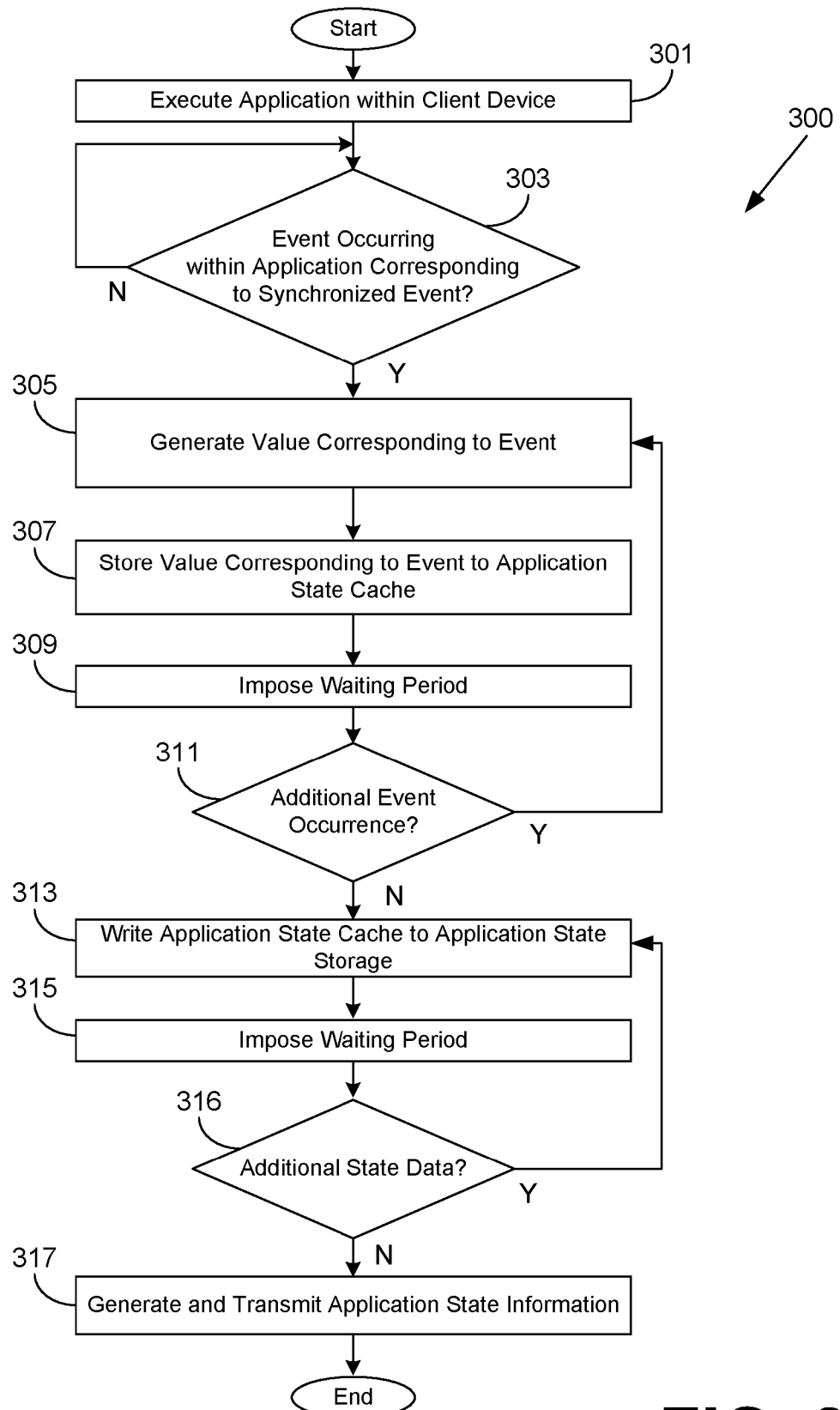
FIG. 3 is a flowchart illustrating one example of functionality implemented as portions of an application executed in a client device according to various embodiments of the present disclosure.

Referring next to FIG. 3, shown is a flowchart 300 that provides one example of execution of an application 233 executed by a client device 103 to generate application state information 241 or a portion of application state information 241. It is understood that the flowchart of FIG. 3 provides merely an example of the many different types of functional arrangements that may be employed to implement the operation of the portion of an application 233 as described herein. As an alternative, the flowchart of FIG. 3 may be viewed as depicting an example of steps of a method implemented in the client device 103 that reports application state information to the application synchronization service 221 for synchronization of state information across multiple devices of a user according to one or more embodiments.

First, in box 301, the application 233 executes functionality associated with the application 233 in a client device 103. As described above, the application 233 has been instrumented by a developer to generate application state information 241 corresponding to events that the developer wishes to synchronize across multiple devices associated with a user account. In box 303, the application 233 determines whether an event occurs during execution of the application for which data is synchronized by the application synchronization service 221. If so, then in box 305, the application 233 generates a value corresponding to the event. At box 307, the value corresponding to the event is stored in the application state cache 243. As noted above, the application state cache 243 can be maintained in memory of the client device 103. At box 309, the application 233 imposes a waiting period to determine whether additional events occur during execution of the application 233 at box 311

If an additional event for which a value is generated occurs during the waiting period, then the process returns to box 305, where the additional value is also stored in the application state cache 243. If no additional events occur during the waiting period, then at box 313, the application state data stored in the application state cache 243 is stored in the application state storage 261. At box 315, another waiting period is imposed while the application 233 determines whether additional data is stored into the application state storage 261 from the application state cache 243. If additional state data is stored into the application state storage 261, then the process returns to box 313. Otherwise, the application 233 may generate application state information 241 that is transmitted to the application synchronization service 221.

Figure 4:
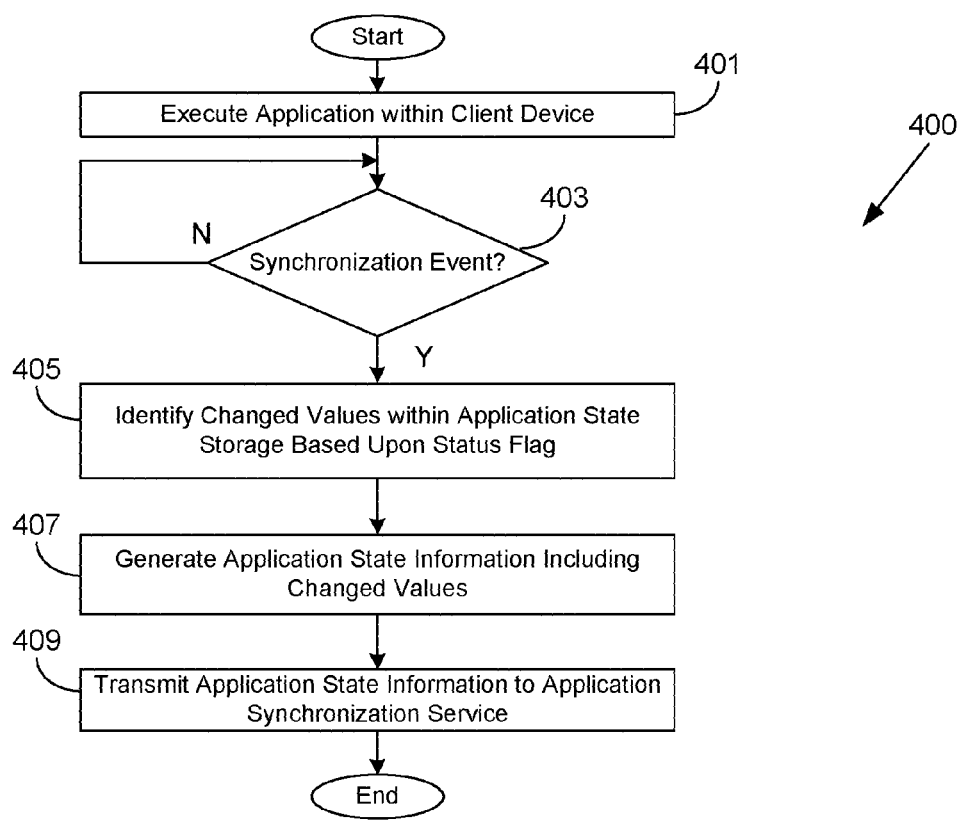
FIG. 4 is a flowchart illustrating one example of functionality implemented as portions of an application executed in a client device according to various embodiments of the present disclosure.

Referring next to FIG. 4, shown is a flowchart 400 that provides one example of execution of an application 233 executed by a client device 103 to generate application state information 241 or a portion of application state information 241 by determining what items within application state storage have changed and generating application state information 241 corresponding to the items that have been modified since a most recent synchronization event. It is understood that the flowchart of FIG. 4 provides merely an example of the many different types of functional arrangements that may be employed to implement the operation of the portion of an application 233 as described herein. As an alternative, the flowchart of FIG. 4 may be viewed as depicting an example of steps of a method implemented in the client device 103 that reports application state information to the application synchronization service 221 for synchronization of state information across multiple devices of a user according to one or more embodiments.

First, in box 401, the application 233 executes functionality associated with the application 233 in a client device 103. At box 403, the application 233 determines whether a synchronization event occurs. As noted above, data can be synchronized with the application synchronization service 221 periodically, upon the occurrence of an event, upon the storage of data with the application state storage 261, etc. At box 405, the application 233 can identify the changed values within application state storage based upon whether the timestamp of a particular key 263 and/or value 265 indicates that a previous synchronization event occurred before the value 265 was synchronized with the application synchronization service 221. As noted above, the application 233 may also identify those items that have changed within application state storage 261 by identifying those items that are associated with a status flag 268 indicating that the items have not been synchronized with the application synchronization service 221.

At box 407, the application 233 generates application state information 241 that includes the values 265 and/or keys 263 as well as any other data related to the value 265 that have changed since a most recent synchronization with the application synchronization service 221. At box 409, the application 233 transmits the application state information 241 to the application synchronization service 221.

Figure 5:
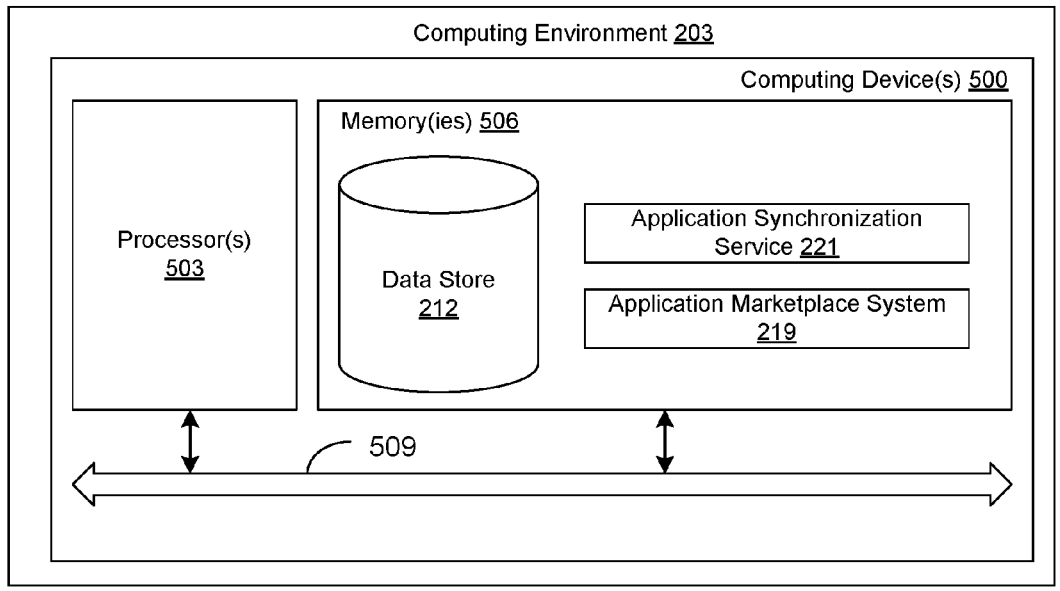
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the application marketplace system 219, application synchronization service 221, and potentially other applications. Also stored in the memory 506 may be a data store 212 and other data. In addition, an operating system may be stored in the memory 506 and executable by the processor 503.

Figure 6:
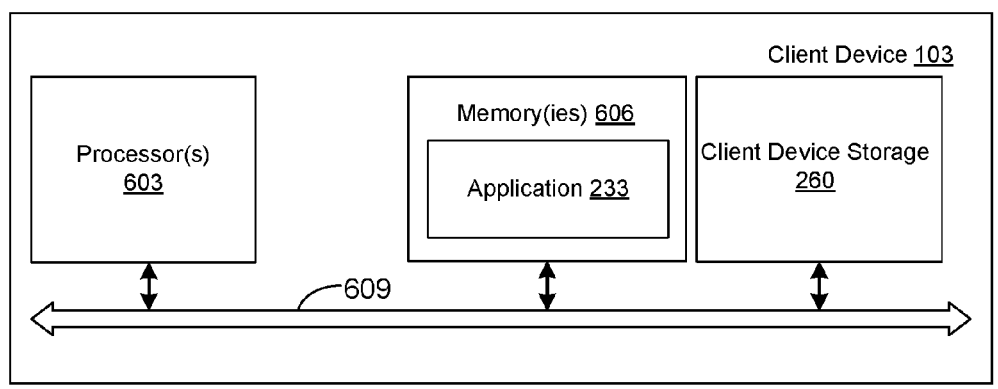
FIG. 6 is a schematic block diagram that provides one example illustration of a client device employed in the networked environment of FIG. 2 according to various embodiments of the present disclosure.

With reference to FIG. 6, shown is a schematic block diagram of the client device 103 according to an embodiment of the present disclosure. The client device 103 includes at least one processor circuit, for example, having a processor 603 and a memory 606, both of which are coupled to a local interface 609. The local interface 609 may comprise, for example, a data bus with an accompanying address/control bus or other bus structure as can be appreciated. A display may also be coupled to the local interface 609.

Stored in the memory 606 are both data and several components that are executable by the processor 603. In particular, stored in the memory 506 and executable by the processor 603 are an application 233 and potentially other applications and/or software. In addition, an operating system may be stored in the memory 606 and executable by the processor 603.

It is understood that there may be other applications that are stored in the memory 506, 606 and are executable by the processor 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506, 606 and are executable by the processor 503, 603. In this respect, the term "executable" means a program file that is in a form that can ultimately be run by the processor 503, 603. Examples of executable programs may be, for example, a compiled program that can be translated into machine code in a format that can be loaded into a random access portion of the memory 506, 606 and run by the processor 503, 603, source code that may be expressed in proper format such as object code that is capable of being loaded into a random access portion of the memory 506, 606 and executed by the processor 503, 603, or source code that may be interpreted by another executable program to generate instructions in a random access portion of the memory 506, 606 to be executed by the processor 503, 603, etc. An executable program may be stored in any portion or component of the memory 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506, 606 is defined herein as including both volatile and nonvolatile memory and data storage components. Volatile components are those that do not retain data values upon loss of power. Nonvolatile components are those that retain data upon a loss of power. Thus, the memory 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503, 603 may represent multiple processors 503, 603 and/or multiple processor cores and the memory 506, 606 may represent multiple memories 506, 606 that operate in parallel processing circuits, respectively. In such a case, the local interface 509, 609 may be an appropriate network that facilitates communication between any two of the multiple processors 503, 603, between any processor 503, 603 and any of the memories 506, 606, or between any two of the memories 506, 606, etc. The local interface 509, 609 may comprise additional systems designed to coordinate this communication, including, for example, performing load balancing. The processor 503, 603 may be of electrical or of some other available construction.

Although the application marketplace system 219, application synchronization service 221 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 3-4 show the functionality and operation of an implementation of portions of the application synchronization service 221 and/or application 233 executed by a client device 103. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIG. 3-4 show a specific order of execution, it is understood that the order of execution may differ from that which is depicted. For example, the order of execution of two or more blocks may be scrambled relative to the order shown. Also, two or more blocks shown in succession in flowcharts of FIGS. 3-4 may be executed concurrently or with partial concurrence. Further, in some embodiments, one or more of the blocks shown in flowcharts of FIG. 3-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the application synchronization service 221, application 233, or any other application or service, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    generating, in response to an occurrence of an event during execution of an application by a client device, a key and a value corresponding to the event;
    storing, by the client device, the key and the value in an application state cache stored in a memory of the client device;
    determining, by the client device, that at least one additional event occurs during the execution of the application during a predetermined waiting period after storage of the key and the value in the application state cache;
    storing, by the client device, a second event and a second value associated with the second event in the application state cache;
    storing, by the client device, the application state cache in application state data stored in a mass storage device associated with the client device after expiration of the predetermined waiting period; and
    transmitting, by the client device, the application state data to an application synchronization service.

2. The method of claim 1, further comprising:
    identifying, by the client device, a plurality of values in the application state data that have changed since a previous synchronization;
    identifying, by the client device, a timestamp associated with the previous synchronization; and
    determining, by the client device, whether the timestamp was generated after respective timestamps associated with the event and the second event.

3. The method of claim 2, wherein identifying the plurality of values in the application state data that have changed since the previous synchronization comprises identifying at least one value associated with a respective status flag indicating that the at least one value has changed since the previous synchronization.

4. The method of claim 1, further comprising:
storing a third key and a third value associated with a third event to the application state cache during a subsequent predetermined waiting period;
updating the application state cache with the third key and the third value;
updating the application state data in the mass storage device with the third key and the third value upon expiration of the subsequent predetermined waiting period; and
transmitting the application state data to the application synchronization service.

5. The method of claim 1, wherein transmitting the application state data to the application synchronization service is performed upon expiration of a second predetermined waiting period.

6. The method of claim 5, wherein the second predetermined waiting period is subsequent to the predetermined waiting period.

7. The method of claim 1, further comprising resetting the predetermined waiting period upon storage of the application state cache in the mass storage device.

8. The method of claim 1, further comprising resetting a synchronization status flag associated with respective values within the application state data upon transmission of the application state data to the application synchronization service.

9. A system, comprising:
a client device;
an application executed by the client device, the application configured to cause the client device to at least:
execute an application, the application generating a value in response to occurrence of an event;
store the value within an application state cache in the client device;
determine that an additional event has occurred during a predetermined waiting period, the additional event associated with a second value;
store the second value in the application state cache; and
store the value and the second value to application state data in a mass storage device in the client device upon expiration of the predetermined waiting period.

10. The system of claim 9, the application further causing the client device to at least:
associate the value with a key and a first timestamp;
associate the second value with a second key and a second timestamp; and
determine whether the value and the second value have changed since a previous synchronization with an application synchronization service based at least in part upon the first timestamp and the second timestamp.

11. The system of claim 10, the application further causing the client device to at least initiate transmission of the key, the value, the second key, and the second value to an application synchronization service upon expiration of an additional waiting period.

12. The system of claim 11, the application further causing the client device to at least reset a synchronization status flag associated with respective values within the application state data upon transmission of the application state data to the application synchronization service.

13. The system of claim 11, the application further causing the client device to at least set a synchronization status flag to indicate that respective values have changed since a previous synchronization in response to at least one event occurring during execution of the application that change the respective values.

14. The system of claim 9, the application further causing the client device to at least:
store a third value to the application state cache during a subsequent predetermined waiting period;
update the application state data in the mass storage device with the third value upon expiration of the subsequent predetermined waiting period; and
transmit the updated application state data to an application synchronization service upon expiration of another subsequent predetermined waiting period.

15. A non-transitory computer-readable medium embodying a program executable on a client device, the program causing the client device to at least:
execute an application, the application generating a value in response to occurrence of an event;
store the value within an application state cache in a memory of the client device;
determine that a second event has occurred during a predetermined waiting period, the second event associated with an additional key and an additional value;
store the second value in the application state cache; and
store the value and the second value in application state data in a mass storage device associated with the client device upon expiration of the predetermined waiting period.

16. The non-transitory computer-readable medium of claim 15, wherein the program further causes the client device to at least:
associate the value with a key and a first timestamp;
associate the second value with a second key and a second timestamp; and
determine whether the value and the second value have changed since a previous synchronization with an application synchronization service based at least in part upon the first timestamp and the second timestamp.

17. The non-transitory computer-readable medium of claim 15, wherein the program further causes the client device to at least reset the predetermined waiting period upon storage of the application state cache in the mass storage device.

18. The non-transitory computer-readable medium of claim 15, wherein the program further causes the client device to at least initiate transmission of the value and the second value to an application synchronization service upon expiration of an additional waiting period.

19. The non-transitory computer-readable medium of claim 18, wherein the program further causes the client device to at least reset a synchronization status flag associated with respective values within the application state data upon transmission of the value and the second value to the application synchronization service.

20. The non-transitory computer-readable medium of claim 15, wherein the program further causes the at least one computing device to at least:
store a third value to the application state cache during a subsequent predetermined waiting period;
update the application state data in the mass storage device with the third value upon expiration of the subsequent predetermined waiting period; and
transmit the updated application state data to an application synchronization service upon expiration of another subsequent predetermined waiting period.

* * * * *